(No Model.)

B. M. WATTS.
Hay Press.

No. 234,509. Patented Nov. 16, 1880.

Witnesses
Geo. H. Strong
Frank A. Brooks

Inventor
Benjamin M. Watts
By Dewey & Co. Attys

UNITED STATES PATENT OFFICE.

BENJAMIN M. WATTS, OF LOS ANGELES, CALIFORNIA.

HAY-PRESS.

SPECIFICATION forming part of Letters Patent No. 234,509, dated November 16, 1880.

Application filed June 19, 1880. (No model.)

*To all whom it may concern:*

Be it known that I, BENJAMIN M. WATTS, of the city and county of Los Angeles, and State of California, have invented an Improvement in Portable Hay-Presses; and I hereby declare the following to be a full, clear, and exact description thereof.

My invention relates to certain improvements in portable hay-presses, and my improvements refer more particularly to a portable field-press for which Letters Patent No. 225,773 were granted to me March 23, 1880, reference to which is hereby specially made.

My improvements consist in certain details of construction by which the power is applied to the follower for pressing the bale while the press is traveling from one cock to another, avoiding the necessity of unhitching the team when pressing a bale; in an improved means of preventing lateral spreading of the body by the bar which controls the corners; and in a means of controlling the cover-holding bar, as well as that bar which supports the bottom or discharge door, as is more fully described in the accompanying drawings, in which—

Figure 1:
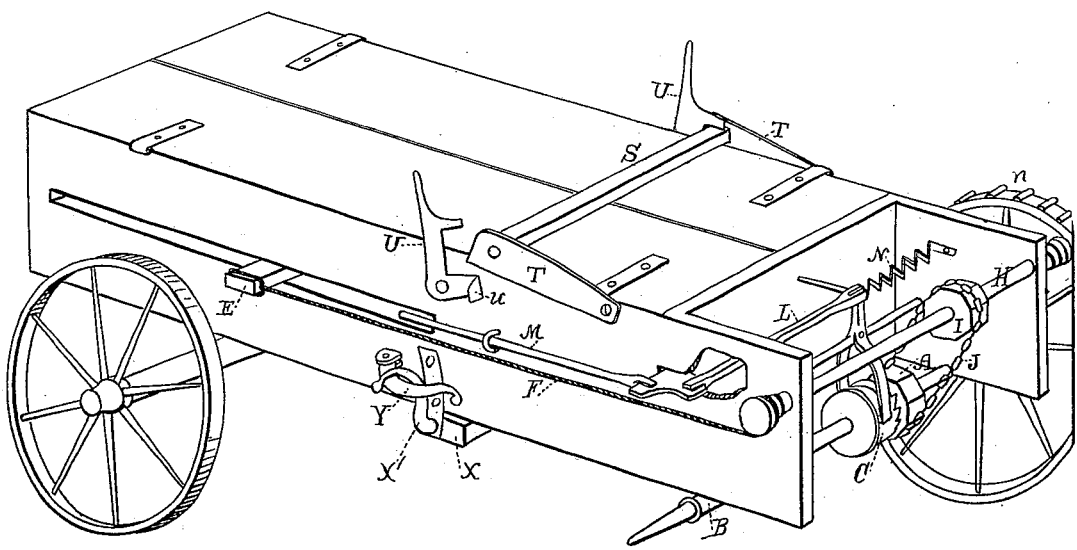
Figure 2:
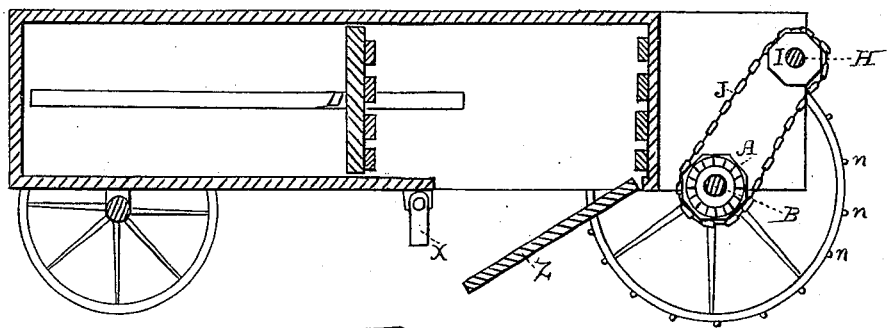
Figure 3:
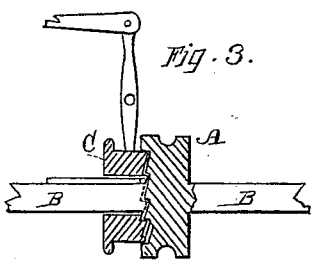

Figure 1 is a view of my device. Fig. 2 is a section. Fig. 3 shows the clutch with its operating-lever.

The follower described in my former patent, hereinbefore referred to, moves toward the forward part of the press in forming the bale, whereas in this instance the direction of the follower is reversed, the power being applied to the follower in a different manner.

A shaft, H, extends across the rear end of the body of the press, and has on its ends spirally-grooved cone-pulleys, on which the chains F, connecting with the projecting ends or extensions E of the follower D, are wound. On the shaft H is a fixed chain-pulley, I, over which passes an endless chain, J, this chain also passing over a loose chain-pulley, A, on the hind axle, B. A clutch, C, on this axle is adapted to connect the chain-pulley A with the shaft, so as to cause said pulley to rotate. A lever, L, having its fulcrum on the side of the press-body, is connected with the clutch C, and another bar or lever, M, is also connected with the lever L, and is placed on the side of the press in such a position that the follower-bar or extension, when it comes far enough back, will impinge upon it and throw off the clutch.

The method of pressing the bale is as follows: The hay is put into the body of the press through the openings of the doors, as described in my former patent. A spring, N, attached to the clutch-bar keeps the clutch in contact, so as to cause the chain roller or pulley on the hind axle to revolve, and as the horses move on to the next cock this hind axle is revolved by the traction of the hind wheels, these wheels having stops $n$ across their tires, or being ribbed, as shown, to insure their revolving. As the hind axle revolves, the chain J revolves the shaft H, which winds up the follower-chains F, thus drawing the follower back and pressing the hay into a bale. As soon as the bale becomes properly pressed and the follower is drawn far enough back to accomplish its object the follower-bar E strikes against the end of the lever M, thus throwing the clutch out of gear and preventing any breakage should the team not stop at the proper time, this action being automatic. As soon as the follower-bar is released and drawn back a little the spring throws the clutch in gear again.

I have only shown one pair of pulleys on the axle and shaft and one connecting-chain, as well as one clutch and disengaging-bar. These may be duplicated, however, so as to have four pulleys, two endless chains, two clutches, and two disengaging-bars, one on each side of the press. A hand-lever may also be provided for the clutch, so as to hold the clutch in or out of gear, independent of the lever M, at the pleasure of the driver, and while traveling with the press.

It will be seen that the manner of obtaining the power for the follower is essentially different from that shown in my former patent. In this it is obtained by the forward motion of the wagon from the two rear wheels, which are rigidly fixed on their axle, so as to turn said axle.

This construction enables me to press the bale while traveling from one cock to the other, and it is never necessary to unhitch the horses and connect them to a bull-wheel rope. I therefore dispense entirely with the bull-wheel shown in my former patent.

The center bar, S, to prevent the lateral spreading of the box while pressing the bale, I form in an improved manner. In the press shown in my former patent this bar was hinged on the doors, and two of these bars were necessary. In my improved bar a single one only is necessary, and it is all in one piece, with no central hinge, but placed on pivoted plates T, so as to swing back to release the doors, these plates serving as hooks or braces to prevent the lateral swelling. This bar swings backward when it is required to open the top doors of the press and forward when they are closed. The plates are wider than the bar, and form lips when the bar is closed down on the door, which, impinging on the sides of the press-body, prevent any lateral swelling of the body from internal pressure.

Pivoted dogs or catches U, with projections $u$ at their lower ends, hold the center bar to its place while at work and release it when required. The small projections or shoulders $u$ on the catches U are intended, as these catches are released from the center bar, to force said bar free from the box. The catches then answer as levers, and by drawing down on their upper ends the projections $u$ are forced against the under sides of the bar and force it free from the box, which it would otherwise be difficult to do, owing to the side pressure on the plates carrying the bar.

On each side of the press is a small pivoted hand-lever, Y, the office of which is to hold the crank of the bar that supports the trap-door, thereby preventing the said bar from turning while pressing the bale.

In my former patent, hereinbefore referred to, the arm or bar for holding the drop-door was held by a hook, and it sometimes pressed so heavily on the hook that the door could not be released. I now use the hand-lever Y to hold the bar, so said bar may be always easily released. This bar is represented at X. The lock or hand-lever Y is hinged to the side of the box. The bar X is raised, underlapping and securing the drop-door Z by the crank X' on its end, as shown, and is locked by the lever Y being thrown to the right, securing the bale while operating. The crank X' is fixed to one end of the bar X outside the press-box. Each end of the bar is pivoted on either side of the box. When the lock Y is thrown to the left the pressure of the bale forces the bar down and the drop-door falls open, the bale being released.

Having thus described my invention, what I claim as new, and desire to secure by Letters Patent, is—

1. In a portable field-press having a rotating axle, B, and chain-pulley A, the supplemental shaft H, with its chain-pulley I and chain J, said shaft being adapted to wind up the chains F, connected with the follower D, whereby the movement of the press over the ground furnishes the power for pressing the bale while moving from one cock to another, substantially as and for the purpose herein described.

2. In combination with the follower D E and the pulley A, adapted to rotate the shaft H, which winds up the follower-chains, the levers L M and clutch C and spring N, whereby the motive power is thrown out of gear automatically when the bale is sufficiently pressed, and thrown in gear again when pressure is released, substantially as and for the purpose herein described.

3. In combination with the portable field-press having upper doors for receiving the loose hay, the center bar, S, with its pivoted plates T, said plates being adapted to close by the sides of the press, whereby lateral swelling of the press is prevented, substantially as herein described.

4. In combination with the center bar, S, with its pivoted plates T, the pivoted catches U, with their projections $u$, whereby said bar is held in position to keep the doors closed and forced from place to open the doors, substantially as herein described.

In witness whereof I have hereunto set my hand.

BENJAMIN MARION WATTS.

Witnesses:
 CHAS. R. JOHNSON,
 JAMES E. GRIFFIN.